(12) United States Patent
Bos et al.

(10) Patent No.: US 8,982,062 B2
(45) Date of Patent: Mar. 17, 2015

(54) MULTI-MODAL USER INPUT DEVICE

(75) Inventors: Jeffrey Charles Bos, Waterloo (CA); Oleg Los, Buffalo Grove, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 577 days.

(21) Appl. No.: 13/103,434

(22) Filed: May 9, 2011

(65) Prior Publication Data

US 2012/0287053 A1   Nov. 15, 2012

(51) Int. Cl.
*G06F 3/0488* (2013.01)
*G06F 3/0354* (2013.01)

(52) U.S. Cl.
CPC ........ *G06F 3/04883* (2013.01); *G06F 3/03547* (2013.01); *G06F 2203/04105* (2013.01)
USPC ........................................................ 345/173

(58) Field of Classification Search
CPC .................. G06F 2203/04105; G06F 3/03547; G06F 3/04883
USPC .................................................. 345/156–184
See application file for complete search history.

(56) References Cited

U.S. PATENT DOCUMENTS

| | | | | |
|---|---|---|---|---|
| 5,469,194 A | * | 11/1995 | Clark et al. | 345/173 |
| 5,914,702 A | * | 6/1999 | Derocher et al. | 345/157 |
| 6,034,672 A | * | 3/2000 | Gaultier et al. | 345/173 |
| 6,243,080 B1 | | 6/2001 | Molne | |
| 7,639,234 B2 | * | 12/2009 | Orsley | 345/156 |
| 7,868,787 B2 | * | 1/2011 | Chung et al. | 341/33 |
| 7,940,253 B2 | * | 5/2011 | Orsley | 345/177 |
| 8,022,935 B2 | * | 9/2011 | Hotelling | 345/173 |
| 8,044,314 B2 | * | 10/2011 | Weber et al. | 200/341 |
| 8,059,099 B2 | * | 11/2011 | Lampell et al. | 345/173 |
| 8,125,461 B2 | * | 2/2012 | Weber et al. | 345/173 |
| 8,232,963 B2 | * | 7/2012 | Orsley et al. | 345/157 |
| 8,274,479 B2 | * | 9/2012 | Prest et al. | 345/169 |
| 8,294,047 B2 | * | 10/2012 | Westerman et al. | 178/18.03 |
| 8,330,061 B2 | * | 12/2012 | Rothkopf et al. | 200/5 R |

(Continued)

FOREIGN PATENT DOCUMENTS

| | | | |
|---|---|---|---|
| DE | 102010003575 A1 | * | 10/2010 |
| EP | 1691263 | | 8/2006 |
| JP | 2010034401 A | * | 2/2010 |

OTHER PUBLICATIONS

Extended European Search Report dated Mar. 1, 2012 for European Patent Application No. 11165348.1.

(Continued)

*Primary Examiner* — Dennis Joseph
*Assistant Examiner* — Chun-Nan Lin
(74) *Attorney, Agent, or Firm* — Jose Gutman; Fleit Gibbons Gutman Bongini & Bianco P.L.

(57) ABSTRACT

A user input device, a portable electronic device including the user input device, and an operating method therefor, manages multiple modes of the user input device based on detected force and direction of tilt. The user input device includes a base member with top surface. A sensor touchpad module is disposed above the top surface of the base member. A plurality of pressure sensors is disposed between the base member and the sensor touchpad module. A processor manages a set of user input modes based on whether at least one of a first set of signals associated with a first user input mode and a second set of signals associated with a second user input mode has been detected.

11 Claims, 11 Drawing Sheets

(56) References Cited

U.S. PATENT DOCUMENTS

| | | | |
|---|---|---|---|
| 8,484,838 B2* | 7/2013 | Badaye et al. | 29/846 |
| 2001/0055004 A1* | 12/2001 | Gerpheide et al. | 345/173 |
| 2002/0126095 A1* | 9/2002 | Cheng et al. | 345/167 |
| 2003/0107547 A1 | 6/2003 | Kehlstadt et al. | |
| 2005/0052425 A1* | 3/2005 | Zadesky et al. | 345/173 |
| 2006/0250377 A1* | 11/2006 | Zadesky et al. | 345/173 |
| 2006/0250733 A1* | 11/2006 | Hopkins | 361/56 |
| 2007/0273671 A1* | 11/2007 | Zadesky et al. | 345/173 |
| 2008/0001926 A1* | 1/2008 | XiaoPing et al. | 345/173 |
| 2008/0007536 A1* | 1/2008 | Jeon et al. | 345/173 |
| 2008/0018611 A1* | 1/2008 | Serban et al. | 345/173 |
| 2008/0062143 A1* | 3/2008 | Shahoian et al. | 345/173 |
| 2008/0122945 A1* | 5/2008 | Ahonen | 348/223.1 |
| 2008/0202824 A1* | 8/2008 | Philipp et al. | 178/18.01 |
| 2008/0273017 A1 | 11/2008 | Woolley et al. | |
| 2009/0046068 A1* | 2/2009 | Griffin | 345/173 |
| 2009/0046069 A1 | 2/2009 | Griffin et al. | |
| 2009/0058802 A1* | 3/2009 | Orsley | 345/157 |
| 2009/0073144 A1* | 3/2009 | Chen et al. | 345/179 |
| 2009/0135145 A1* | 5/2009 | Chen et al. | 345/173 |
| 2009/0189789 A1* | 7/2009 | Oh | 341/20 |
| 2009/0283300 A1* | 11/2009 | Grunthaner | 174/254 |
| 2010/0030469 A1* | 2/2010 | Hwang et al. | 701/209 |
| 2010/0079404 A1* | 4/2010 | Degner et al. | 345/174 |
| 2010/0127975 A1* | 5/2010 | Jensen | 345/157 |
| 2010/0128003 A1* | 5/2010 | Orsley | 345/175 |
| 2010/0279738 A1* | 11/2010 | Kim et al. | 455/566 |
| 2010/0315337 A1* | 12/2010 | Ferren et al. | 345/158 |
| 2011/0012845 A1* | 1/2011 | Rothkopf et al. | 345/173 |
| 2011/0043491 A1* | 2/2011 | Oh | 345/177 |
| 2011/0122061 A1* | 5/2011 | Stenmark et al. | 345/157 |
| 2011/0248959 A1* | 10/2011 | Diehl | 345/175 |
| 2012/0098846 A1* | 4/2012 | Wun et al. | 345/589 |
| 2012/0113044 A1* | 5/2012 | Strazisar et al. | 345/174 |
| 2012/0188181 A1* | 7/2012 | Ha et al. | 345/173 |
| 2012/0212420 A1* | 8/2012 | Shin | 345/173 |
| 2012/0271545 A1* | 10/2012 | Cheng | 701/431 |
| 2012/0287166 A1* | 11/2012 | Wyatt | 345/690 |

OTHER PUBLICATIONS

Sailli, Review: The Android 1.2 Flagship HTC Desire in the Test 63.
Nguyen, C., Smartphone Reviews, News, and Video, Pocketnow. conn, Samsung i780 Optical Joystick Previewed, Nov. 16, 2007.
My Stuff, The Best Gadgets on the Planet, Nokia E52, Sep. 9, 2009.

* cited by examiner

MULTI-MODAL USER INPUT DEVICE

FIELD OF THE DISCLOSURE

The present disclosure generally relates to user interfaces for electronic devices and more particularly to user input interfaces.

BACKGROUND

Portable or handheld electronic devices including cellular phones and the like comprise user interface input devices that allow a user to interact with items presented on a display. Examples of user interface devices include arrow keys, trackballs, trackpads, and more recently, finger movement navigation modules. Optical Navigation Modules (ONMs) generally sense a gesture performed upon the module by a user's finger. These gestures are interpreted by the electronic device in order to carry out a perceived intention of the user. However, current ONMs have several shortcomings. For example, moving a cursor one step in any direction, such as when moving the cursor to a next letter in a word, can be difficult with current ONMs. Also, scrolling through long documents or across maps can be very difficult with current ONMs. For example, a user may need to perform many swipes/gestures to move the cursor across many pages or from point to point on a map.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 1:
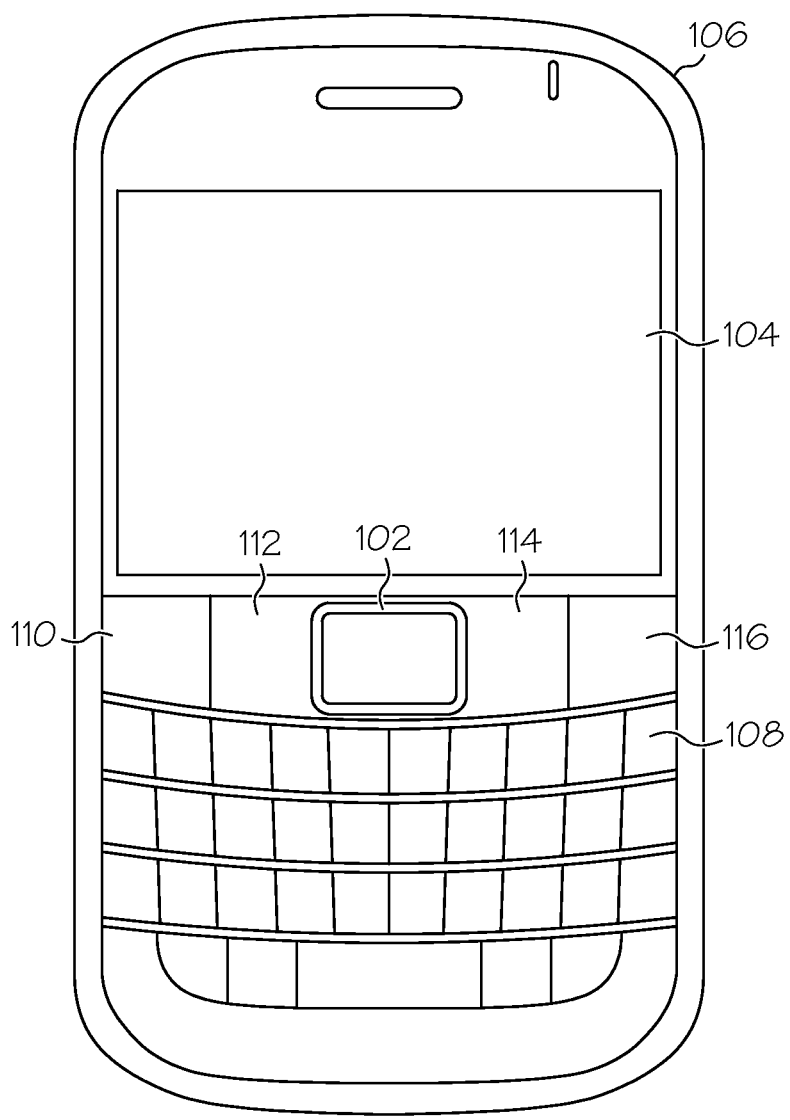
FIG. 1 illustrates a portable electronic device with a multi-modal user input device in accordance with one example.

FIG. 1 illustrates a portable electronic device 100 with a multi-modal user input device 102 in accordance with one example. The portable electronic device 100 in this example is a portable smartphone that supports cellular voice communications and also data communications with a central network. In one example, the electronic device 100 performs data communications with a wireless network to support accessing and exchanging data over the Internet. Data received by the electronic device is displayed on a display 104 (also referred to herein as a "user interface display 104"), which is able to be an alpha-numeric only display or a graphical display. In one example, the display 104 presents a graphical user interface for a user to access functions and to receive information.

The electronic device 100 is housed within a device case 106. The display 104 mounts on a surface of the device case 106. An alpha-numeric keyboard 108 is also physically coupled to the same surface of the device case 106 as the display 104. In various examples, the alpha-numeric keyboard 108 is able to be a QWERTY keyboard, a numeric telephone keypad, or any suitable user input device, such as a virtual keyboard implemented as key images rendered on a touchscreen display.

The device case 106 further includes a number of function keys. The illustrated device case 106 has a first function key 110, a second function key 112, a third function key 114, and a fourth function key 116. These function keys are able to be associated with a dedicated function, such as presenting an interface to initiate a voice call whenever pressed, or the function key is able to be associated with different functions based upon a current operating mode of the electronic device 100.

The device case 106 further has a multi-modal user input device 102 (also referred herein to as "input device 102"). The design and operation of the input device 102 is discussed in further detail below. The input device 102 of one example is a finger movement and pressure sensing device that a user performs a gesture on and/or presses with a finger. The multi-modal user input device 102 identifies/tracks the gesture and/ or determines a location of a user's pressing as well as a magnitude of pressure exerted by the user onto the input device 102.

As used herein, the term press (and its derivatives) indicates any touching of a touch surface 232 (FIG. 2) of the input device 102 with an amount of pressure in a direction substantially normal to the touch surface 232 and sufficient to differentiate from a gesture of moving an object in contact with and across the touch surface 232 in a given substantially horizontal plane. The term press is contrasted with a gesture of pushing, for example in a direction generally or substantially not parallel to the touch surface 232. Accordingly, a press does not require a corresponding non-parallel touch movement on the touch surface 232, but merely the detection by the device 100 of such general or substantially non-parallel pressure that may be differentiated or distinguished from a generally coplanar or parallel movement across a surface of the touch surface 232.

In one example, with respect to finger movement navigation, the input device 102 detects a sliding, dragging, pushing, or pulling movement of a user's finger or stylus (or similar object) across a top portion of the input device 102. The device 100 distinguishes a gestural movement from a pressing action based on the amount of pressure applied during the gesture and/or the specific movement involved during the gesture. Based upon a starting position and ending position of the gestural movement (and optionally any intermediate positions) a user input direction is determined. In one operating mode of the electronic device 100, processing determines a direction to move a user interface element based upon the attributes/characteristics of the detected gestural movement, and optionally determines a magnitude, such as distance to move the element or speed with which to move the element, based upon a velocity, acceleration, and/or deceleration, of the user's finger or a stylus during the gestural movement.

In another example, the input device 102 can be moved in various directions by the user's finger or a stylus. For example, the user is able to push, or pull the input device 102 in multiple directions along the X/Y plane. The user is also able to tilt the input device 102 in various directions along its center axis. The degree of tilt, in one example, can be varied by the user. In either example, the user is also able to press the input device 102 as the input device is being moved/tilted, hold the input device 102 at a tilted or a pushed/pulled position, and vary the degree of pressure. The input device 102 determines the direction (and optionally degree) of movement or tilt as well as a magnitude of pressure exerted by the user onto input device 102. Based upon the direction (and optionally degree) of movement and magnitude of pressure that has been determined, a user input direction and magnitude is determined. In one operating mode of the electronic device 100, processing determines a direction to move a user interface element based upon the detected movement, and determines a magnitude, such as distance to move the element or speed with which to move the element, based upon the pressure (and optionally the degree of movement as well).

Figure 2:
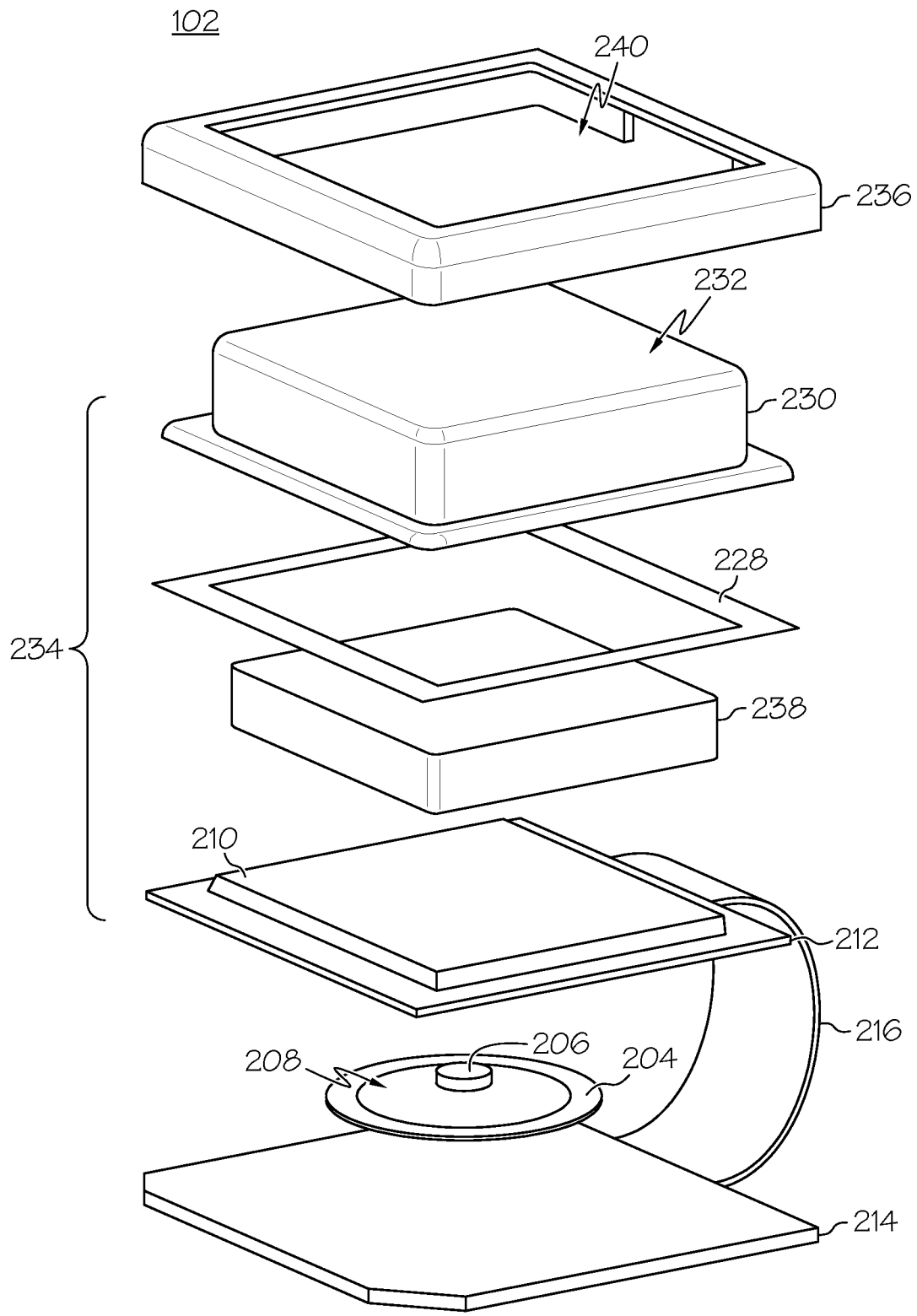
FIG. 2 is an exploded view of a multi-modal user input device, in accordance with one example.

The input device 102 will now be discussed in more detail. FIG. 2 shows an exploded side view of the input device 102. In particular, FIG. 2 shows that the input device 102 comprises a dome-shaped member/membrane 204 that, in one example, is made from one or more flexible materials, deformable materials, or materials that respond to pressure. However, according to certain embodiments, the dome-shaped member/membrane 204 can also be rigid as well.

According to the current example, the dome-shaped membrane 204 comprises an extending member 206, such as a plunger, that vertically extends from a top surface 208 of the membrane 204 in a direction that is away from the top surface 208. In one example, the extending member 206 is disposed substantially in the center of the dome-shaped membrane 204 (i.e. at the peak point of the dome).

Figure 3:
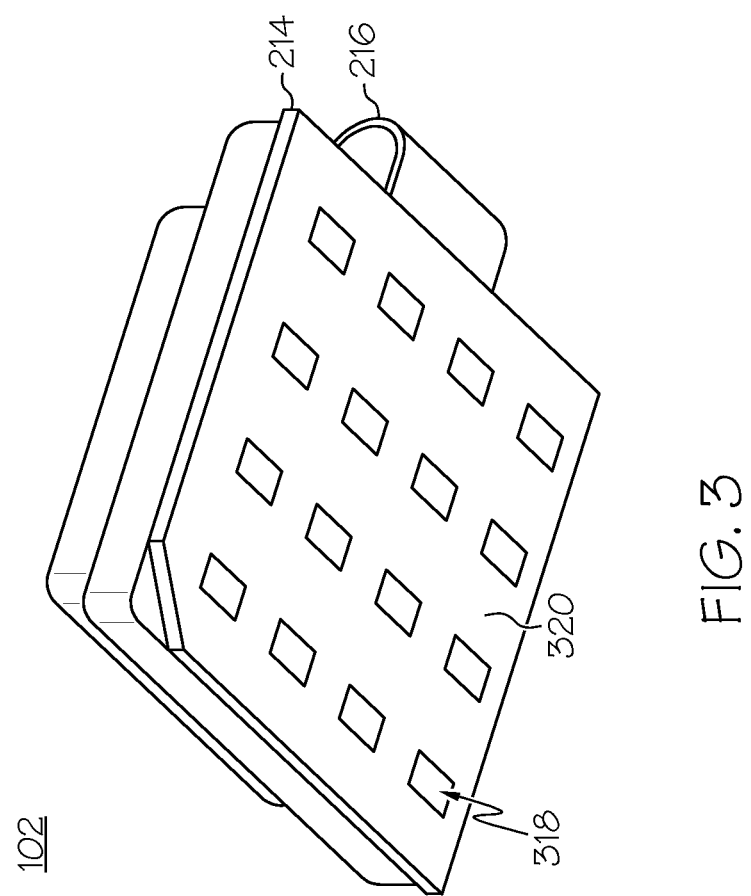
FIG. 3 is a bottom side perspective view of the multi-modal user input device of FIG. 2, in accordance with one example.

The input device 102 further comprises a circuit board 210 that sends and receives signals to and from a sensor 238 that is capable of sensing finger motion such as, but not limited to an optical sensor, an electromagnetic sensor, etc. The circuit board 210 is coupled to a first flex member 212 that is coupled to a second flex member 214 by a flex connector 216 such as, but not limited, a ribbon, cable, or the like, comprising electrical pathways. The second flex member 214 comprises a plurality of contacts/pads/members 318 disposed on a bottom surface 320 of the second flex member 214 that faces in a direction that is away from the first flex member 212, as shown in FIG. 3. These contacts/pads 318 electrically couple to a circuit board of the portable electronic device 100 to provide a communication path between the input device 102 and a system controller (not shown). In an example where the dome-shaped member 204 is rigid, the extending member 206 can be electrically coupled with at least one of the contacts/pads 318.

The input device 102 further comprises a layer of adhesive 228 that serves to attach a sensor cover 230 to the first flex member 212. The sensor cover 230, in one embodiment, comprises a top portion 232 (also referred to herein as "touch surface 232") that a user can touch to interact with the user input device 102. The user can touch the touch surface 232 to move, tilt, and/or depress the sensor cover 230, a sensor 238, and the first flex member 212 (or a portion of the first flex member 212), which are herein collectively referred to as the "sensor joystick module" 234 or "sensor touchpad module" 234. In one embodiment, at least the touch surface 232 is made of one or more materials that allow finger movement sensing to be performed by the sensor 238. The input device further comprises a retaining member 236 that retains the sensor cover 230 over the sensor 238. The retaining member 236 comprises a cavity 240 for receiving a portion of the sensor cover 230.

Figure 4:
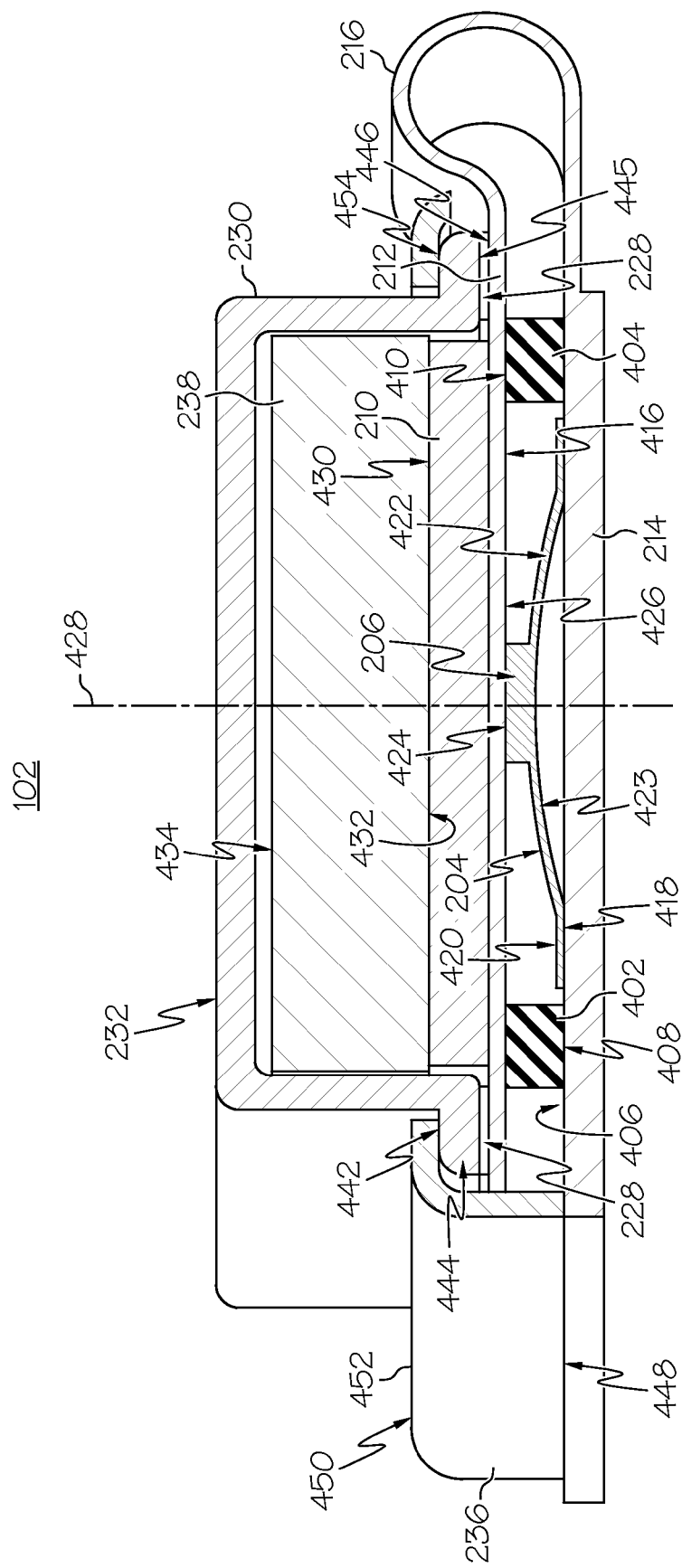
FIG. 4 is a cross-sectional view of the multi-modal user input device of FIG. 2, in accordance with one example.

FIG. 4 shows a cross-sectional view of the input device 102. As can be seen in FIG. 4, the second flex member 214 acts as a base, and in one example, is flat and has a substantially rectangular or square configuration that extends along a base plane. However, other configurations are also applicable as well. A plurality of sensors 402, 404 are disposed on a top surface 406 of the second flex member 214. In one example, these sensors are used to detect a force/pressure and a magnitude of the force/pressure. A bottom portion 408 of each sensor 402, 404 substantially contacts the top surface 406 of the second flex member 214 and are electrically coupled to one or more of the contacts/pads 318. That is, for example, the bottom portion 408 of each sensor 402, 404, can electrically contact one or more electrical contacts on the top surface 406 of the second flex member 214, where the one or more electrical contacts on the top surface 406 are electrically coupled with the one or more of the contacts/pads 318 on the bottom surface 320 of the second flex member 214.

A top portion 410 of each sensor 402, 404 substantially contacts a bottom surface of the first flex member 212. However, it should be noted that other configurations apply as well. For example, the sensors 402, 404 can be disposed anywhere between the top surface 406 of the base member (second flex member 214) and the bottom surface 412 of the sensor touchpad module 234. As will be discussed in greater detail below, the sensors 402, 404 are used to determine/estimate a given amount of pressure being applied to the sensor touchpad module 234 by the user and a direction of tilt as a result of the user depressing the touch surface 232 of the sensor touchpad module 234.

Figure 5:
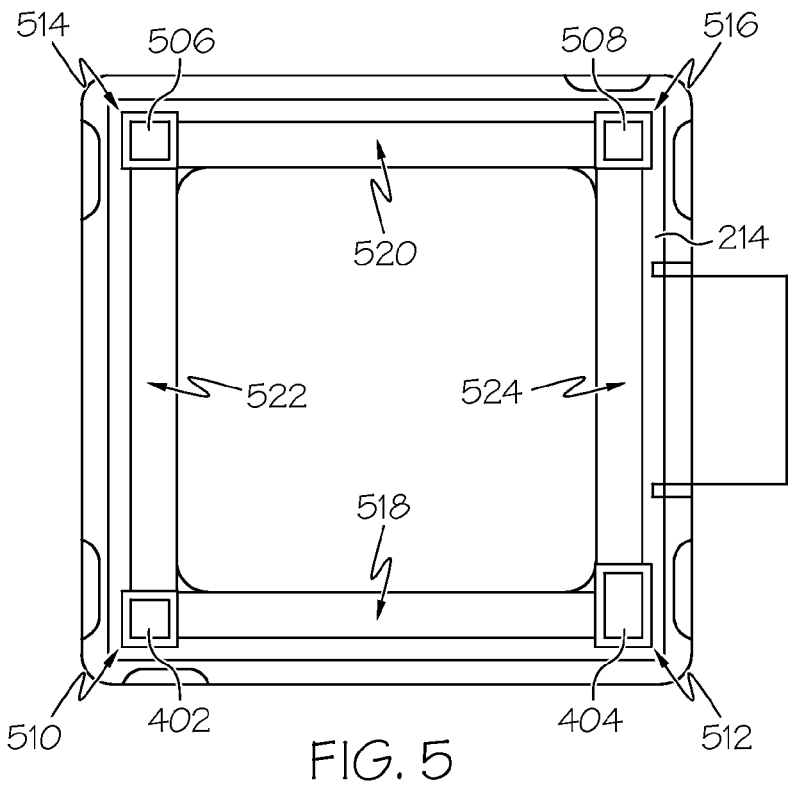
FIGS. 5-6 illustrate various sensor locations on the multi-modal user input device of FIG. 2, in accordance with one example.
Figure 6:
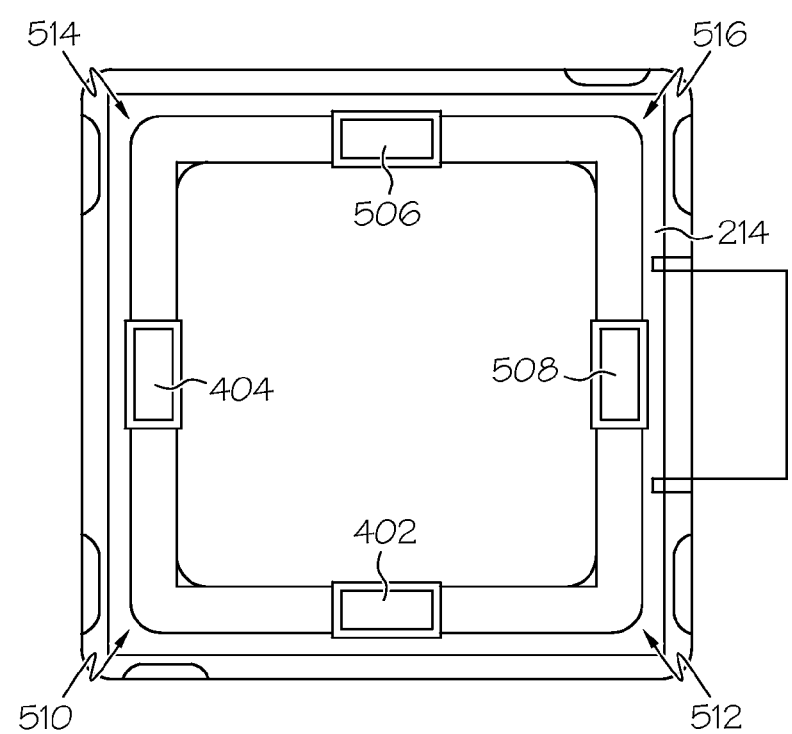

FIGS. 5-6 show various examples of the locations where the sensors can be disposed on the second flex member 214. As can be seen in FIG. 4 four sensors 402, 404, 506, 508 are disposed along the periphery of the second flex member 214 at the four corners 510, 512, 514, 516. For example, the second flex member 214 comprises a first side 518, a second side 520, a third side 522, and a fourth side 524. The first side 518 is perpendicular to the third and fourth sides 522, 524. The first side 518 is parallel to and situated substantially opposite from the second side 520. The third and fourth sides 522, 524 are parallel to and situated opposite from each other and perpendicular to the second side 520.

A first corner region 510 is situated where the first and third sides 518, 522 intersect. A second corner region 512 is situated where the first and fourth sides 518, 524 intersect. A third corner region 514 is situated where the second and third sides 520, 522 intersect. A fourth corner region 516 is situated where the second and fourth sides 520, 524 intersect. A first sensor 402 can be disposed on the first corner region 510. A second sensor 404 can be disposed on the second corner region 512. A third sensor 506 can be disposed on the third corner region 514. A fourth sensor 508 can be disposed on the fourth corner region 516. Alternatively, the sensors 402, 404, 506, 508 can be disposed substantially in between the corner regions 510, 512, 514, 516, as show in FIG. 6. It should be noted that the number of sensors shown in FIGS. 5-6 are only used as an example and one or more sensors can be added and/or removed. It should also be noted that the location of each sensor shown in FIGS. 5-6 is also used only as an example and the sensors can be placed in other locations as well.

Returning now to FIG. 4, according to one example, the dome-shaped membrane 204 is disposed between the first flex member 212 and the second flex member 214 such that a bottom surface 418 of an outer periphery region 420 of the membrane 204 substantially contacts the top surface 406 of the second flex member 214. In one example, the bottom surface 418 of the membrane 204 is electrically coupled to one or more of the contacts/pad 318 disposed on the second flex member 214. A domed region 422 of the membrane 204 extends above the top surface 406 of the second flex member 214 such that the domed region 422 is able to flex in a vertical direction. At least a portion of the extending member 206 of the membrane 204 extends upward and optionally contacts a bottom surface 424 of the first flex member 212 at least when the sensor touchpad module 234 is in a resting state (i.e., not being depressed).

In the example of FIG. 4, a top surface 424 of the extending member 206 is shown substantially contacting a bottom surface 426 of the first flex member 212. In this example, the extending member 206 is aligned substantially with the center axis (represented by dashed line 428) of the sensor touchpad module 234. It should be noted that in another example, the top surface 424 of the extending member 206 can be configured to only contact the bottom surface 426 of the first flex member 212 when the sensor touchpad module 234 is depressed by a given amount (i.e. a given distance). It should also be noted that, according to various examples, the dome-shaped member/membrane 204 can be vertically oriented with either the domed region 422 facing upward with the dome extending toward the bottom surface 416 of the sensor touchpad module 234 or facing downward with the dome extending toward the top surface 406 of the second flex member 214.

The domed region 422 and the extending member 206 create a tilting or pivoting point along the center axis 428 such that as the user presses the touch surface 232 near an outer or corner region (See FIG. 8) of the touch surface 232 the sensor touchpad module 234 experiences a degree of tilt with respect to the center axis 428. The dome-shaped membrane 204 is resilient such that it exerts an axial force against the bottom surface 416 of the first flex member 212 in a direction that is away from the top surface 406 of the second flex member 214. Therefore, when the user presses down on the touch surface 232, thereby exerting a force on the sensor touchpad module 234 in a direction towards the top surface 406 of the second flex member 214, the membrane 204 exerts an opposite force on the bottom surface 416 of the first flex member 212. This opposite force returns the sensor touchpad module 234 to a resting position when it is not being depressed.

The circuit board 210 is disposed on top of the first flex member 212 is coupled to the second flex member 214 by the connector 216. A top surface 430 of the circuit board 210 substantially contacts and is electrically coupled to a bottom surface of the sensor 238. The sensor 238 is discussed in greater detail below. The sensor cover/housing 230 s disposed over the sensor 238 and substantially surrounds the sensor 238 and the circuit board 210. The top portion 232 (touch surface) of the sensor cover 230 is disposed over a top surface 434 of the sensor 238. A first side portion 802 (see FIG. 8), a second side portion 803, a third side portion 805 and a fourth side portion 807 are situated substantially perpendicular to the same plane.

These side portions 802, 803, 805, 807, also substantially surround side portions of the sensor 238 and the circuit board 210. The first side portion 802 and the second side portion 803 are situated substantially opposite from and parallel to each other and substantially perpendicular to the third and fourth side portions 805, 807. The third and fourth side portions 805, 807 are situated substantially opposite from and parallel to each other. The top portion 232 of the cover 230 is disposed on a plane that is substantially perpendicular to the planes on which the side portions 802, 803, 805, 807 are disposed.

A lower region 442 of each side portion 802, 803, 805, 807 comprises a flanged portion 444 that is substantially perpendicular to the side portions 802, 803, 805, 807 and substantially parallel to the top portion 232 of the cover 230. This flanged portion 444 circumscribes the lower region 442 of each of the side portions 802, 803, 805, 807. A bottom surface 445 of the flanged portion 444 is coupled to the top surface 446 of the first flex member 212 by the layer of adhesive 228.

A bottom surface 448 of the retaining member 236 coupled to the top surface 406 of the second flex member 214. At least a portion of the top and side portions 232, 802, 803, 805, 807 of the sensor cover 230 extend through the cavity 240 (see FIG. 1) of the retaining member 236 above a top surface 450 of a top portion 452 of the retaining member 236. A bottom surface 454 of the top portion 452 of the retaining member 236 abuts/contacts and is substantially parallel to a top surface of the flanged portion 444 of the sensor cover 230. This contact between the bottom surface 454 of the top portion 452 of the retaining member 236 and the top surface of the flanged portion 444 occurs when the sensor touchpad module 234 is generally in a resting position (e.g., the touch surface 232 is not being depressed). This retains the sensor touchpad module 234 within the retaining member 236.

In one example, a controller/processor 1102 (see FIG. 11) detects a user's intent to use the input device 102 in at least one of multiple modes. As discussed above, one mode of the input device 102 is a finger movement navigation mode. In the finger movement navigation mode, the controller/processor 1102 determines a user input direction based upon a starting position and ending position of the gestural movement (and optionally any intermediate positions). Optionally, a magnitude, such as distance to move the element or speed with which to move the element, is determined based upon a velocity, acceleration, and/or deceleration of the user's finger or stylus during the gestural movement.

Figure 7:
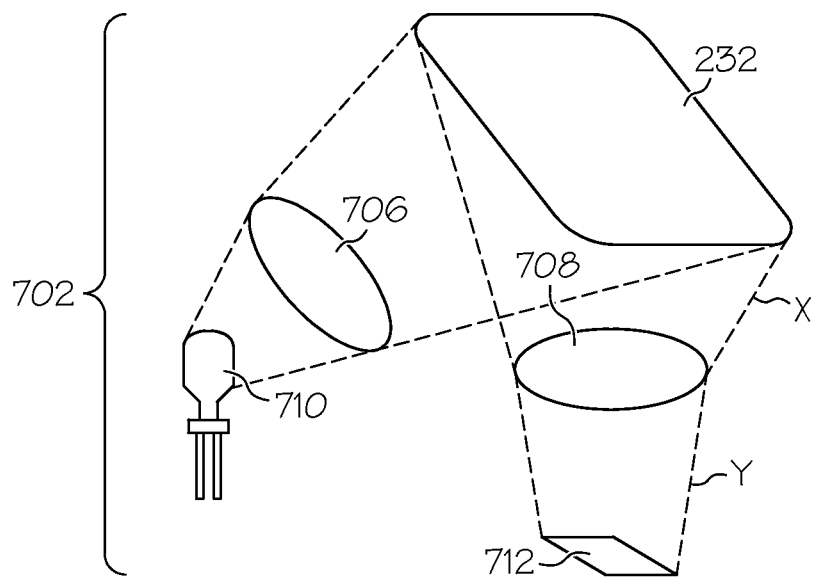
FIG. 7 illustrates various components of a sensor of the multi-modal user input device of FIG. 2, in accordance with one example.

FIG. 7 shows one example of various components of the sensor 238 utilized by the input device 102 for finger movement navigation. FIG. 7 shows the touch surface 232 and finger movement means 702, which form part of the sensor 238, for sensing a gestural movement upon the touch surface 232. Finger movement means 702 are any known method for sensing a movement upon a touch surface, including the means herein disclosed, or hereafter invented, for sensing movement upon a touchpad surface 232 such as using light, and including impinging a surface of the touchpad with light, and observing reflected light with a light sensor.

FIG. 7 shows that the finger movement means 702 comprises an emitter lens 706, receiver lens 708, a light emitter 710, for example an LED, and a light receiver 712 for example an optical or light sensor, respectively. It should be noted that while two lenses are illustrated, a single lens 706 or 708 can be sufficient, or a single lens serving both the emitter and receiver, or no lens may be needed, in some embodiments. As a gesture is created on the touch surface 232 the light emitted onto the touch surface by the emitter lens 706 is varied by the user's finger or stylus. These variations in the light are passed to the light receiver 712 by the receiver lens 710. Processing then analyzes the variations to determine user input direction and magnitude based on the gesture. It should be noted that this is only one example of performing finger movement navigation and any method of finger movement navigation such as, but not limited to, electromagnetic field sensing, is applicable to the input device 102.

In one example, the finger movement navigation mode of the input device 102 is activated in response to a force/pressure being applied to the sensor touchpad module 234 below a given threshold. For example, one or more of the sensors 402, 404, 506, 508 generate a signal(s) in response to an amount of pressure being exerted thereon. This signal is passed to a controller/processor that determines if the amount of force/pressure detected is above or below a given threshold. If the amount of detected force/pressure is below the given threshold then the finger movement navigation mode is activated. The movement of the finger touch on the top surface 232 of the sensor touchpad module 234 is sensed by the sensor 238 and passed to the controller/processor. If the amount of the detected force/pressure is above the given threshold then another mode of the input device is activated and the finger movement navigation mode is deactivated. In another example, the dome-shaped member 204 can comprise force/pressure sensing elements disposed between the domed region 422 of the membrane 204 and the top surface 406 of the second flex member 214. In this example, the force/pressure sensing elements of the membrane 204 generate the signal(s) discussed above. It should be noted the force/pressure being detected by the other sensors 402, 404, 506, 508 discussed above can be used to activate/maintain or deactivate the finger movement navigation mode as well.

In yet another example, the controller/processor 1102 monitors whether a signal is generated when the underside of the domed region 422 or the underside of the membrane 204 contacts a pad/contact on the top surface 406 of the second flex member 214. For example, as a user depresses the sensor touchpad module 234 a given distance, the underside of the domed region 422 or the underside of the membrane 204 contacts the top surface 406 of the second flex member 214. This contact generates a signal that is detected by the controller/processor 1102. The controller/processor 1102 in response to detecting this signal, deactivates the finger movement navigation mode and places the input device 102 into a new mode. Once contact between the underside of the domed region 422 or the underside of the membrane 204 and the contacts 318 on the top surface 406 of the second flex member 214 is broken, the signal is terminated, and the controller/processor 1102 deactivates the current mode and activates the finger movement navigation mode of the input device 102.

It should be noted that instead of the contact being made between underside of the domed region 422 or the underside of the membrane 204 and the top surface 406 of the second flex member 214, contact can be made between the top surface 424 of the extending member 206 and the bottom surface 416 of the first flex member 212. For example, in one example, the top portion 424 of the extending member 206 does not contact the bottom surface 416 of the first flex member 212 until the sensor touchpad module 234 is depressed by a given amount. In another example, the bottom surface 416 of the first flex member 212 comprises a recessed area (not shown) that at least part of the extending member 206 resides within. In this example, a portion of the domed region 422 of the membrane 204 contacts the bottom surface 416 of the first flex member 212 to allow the sensor touchpad module 234 to tilt, as discussed above.

As the sensor touchpad module 234 is depressed, the top surface 424 of the extending member 206 contacts a top surface of the recessed area, thereby generating the signal discussed above. It should be noted that a combination force/pressure and contact sensing can be used as well in the examples given above. It should also be noted that the examples given above that sense contact between the extending member 206 or the domed region 422 and the second or first flex members 214, 212 can also be used to determine a selection action by the user. For example, if the cursor is over a hyperlink on a webpage, the user can depress the sensor touchpad so that the extending member 206 or the domed region 422 contacts the second or first flex members 214, 212, as discussed above. This indicates that the user's intent is to select the hyperlink.

Figure 8:
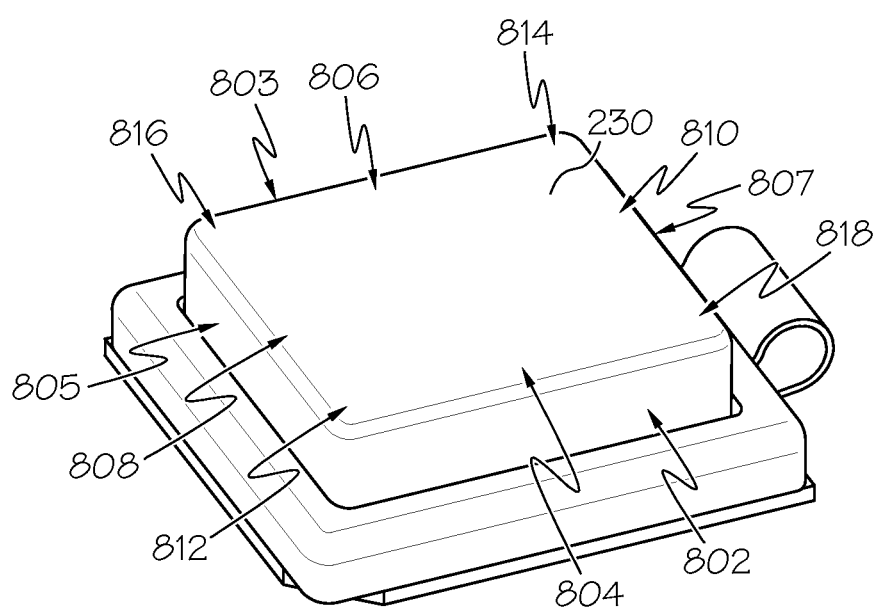
FIG. 8 illustrates a top side perspective view of the multi-modal user input device of FIG. 2, in accordance with one example.

As discussed above, when a given amount of force/pressure and/or a given contact signal is generated, the controller/processor changes the mode of the input device 102. In one example, the controller/processor switches the input device 102 from a finger movement navigation mode to a directional navigation mode that allows the sensor touchpad module 234 to be used as a directional pad. For example, as shown in FIG. 8, the input device 102 is disposed within the portable electronic device 100 such that the user is able to depress a first outer region 804, a second outer region 806, a third outer region 808, and a fourth outer region 810 (and any region in between) of the touch surface 232 of the sensor cover 230. In one example, each region corresponds to a given direction in the X/Y plane. For example, the first outer region 804 corresponds to a negative direction (e.g., down) in the Y plane when depressed, the second outer region 806 corresponds to a positive (e.g. up) direction in the Y plane when depressed, the third outer region 808 corresponds to a negative (e.g., left) direction in the X plane, and the fourth outer region corresponds to a positive (e.g., right) direction in the X plane. Also, a user is able to depress a first, second, third, or fourth corner region 812, 814, 816, 818, each corresponding to a diagonal movement in the X/Y plane.

Figure 9:
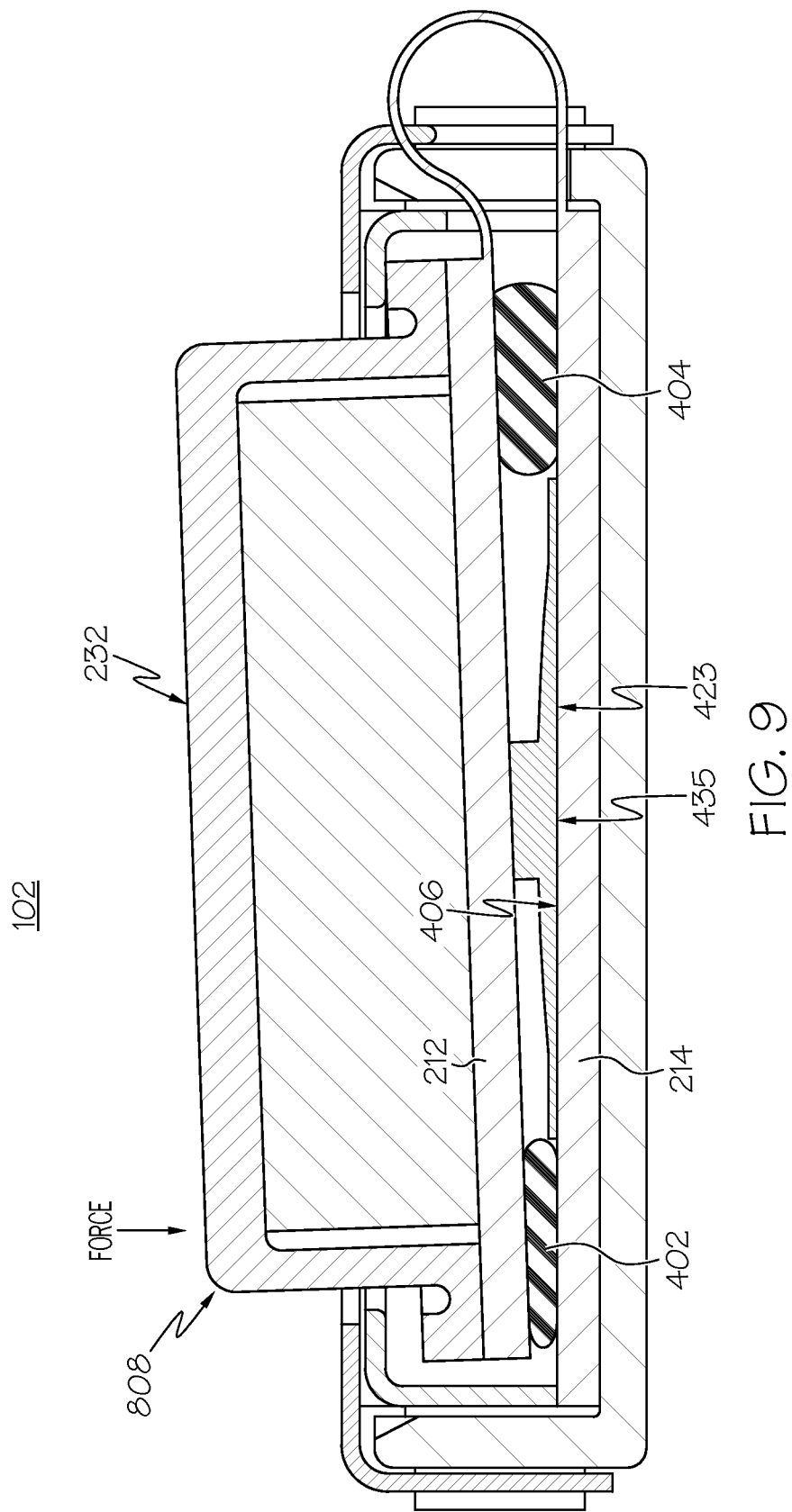
FIG. 9 is a cross-sectional view of the multi-modal user input device of FIG. 2 where a touch surface of the input device has been depressed at an outer region thereof, in accordance with one example.

FIG. 9 shows one example, of the sensor touchpad module 234 being depressed with a substantially downward axial force on the third outer region 808 on the touch surface 232. As can be seen from FIG. 9, the sensor touchpad module 234 is tilted with respect to its center axis as a result of the substantially downward axial force applied at the third outer region 808. In particular, the sensor touchpad module 234 is slanted towards the region 808 experiencing the downward axial force. Therefore, the fourth outer region 810 (and corresponding regions of the other components of the sensor touchpad module 234), which is situated substantially opposite from the third outer region 808, comprises a higher elevation than the third outer region 808 with respect to the base plane. Also, a contact element such as the bottom surface 423 of the domed region 422 of the membrane 204 and/or the bottom surface 435 of the extending member 206 contact the top surface 406 of the second flex member 214 as a result of this substantially downward axial force. As discussed above, this generates a signal that indicates to the controller/processor 1102 the intent of the user, which is to use the input device 102 in a directional navigation mode as compared to a finger movement navigation mode.

In this example, each of the sensors 402, 404, 506, 508 generates a signal representing the amount of force/pressure being detected by each sensor as a result of the substantially downward axial force being applied to the third outer region of the touch surface 232. The controller/processor 1102 analyzes these signals to determine which sensor(s) 402, 404, 506, 508 is/are experiencing the greatest force/pressure. In the example of FIG. 9, the controller/processor 1102 determines that the first/third sensor 402, 506 pair corresponding to the third outer region 808 are experiencing a greater force/pressure than the first/second 402, 404 sensor pair corresponding to the first outer region 804, the third/fourth sensor pair 506, 508 corresponding to the second outer region 806, and the second/fourth sensor pair 404, 508 corresponding to the fourth outer region 810. Therefore, the controller/processor 1102 determines that the user has depressed the third outer region 808 of the touch surface 232 and, therefore, intends a movement in the "left" direction (−x direction in the X/Y plane) in this example.

It should be noted that if one of the sensors in an identified sensor pair is experiencing a force/pressure that is greater than the other sensor in the pair by a given threshold, the controller/processor detects this as diagonal direction intent by the user. For example, if the first sensor 402 in the first/third sensor pair is experiencing a greater force/pressure than the third sensor 506 that is above a given threshold, the controller/processor determines that the user intends a downward left (i.e., −x, −y) direction.

Based on the identified direction intended by the user, the controller/processor 1102 moves an object(s) on the display in the direction intended by the user. In one embodiment, this movement is discrete or incremental as compared to a continuous movement, such as that performed with respect to the finger movement navigation mode. This allows smaller and more refined movements as compared to the finger movement navigation mode. This is advantageous because it allows the user more control over the movements of items and to be able to more precisely step through data presented on the display 104.

Figure 10:
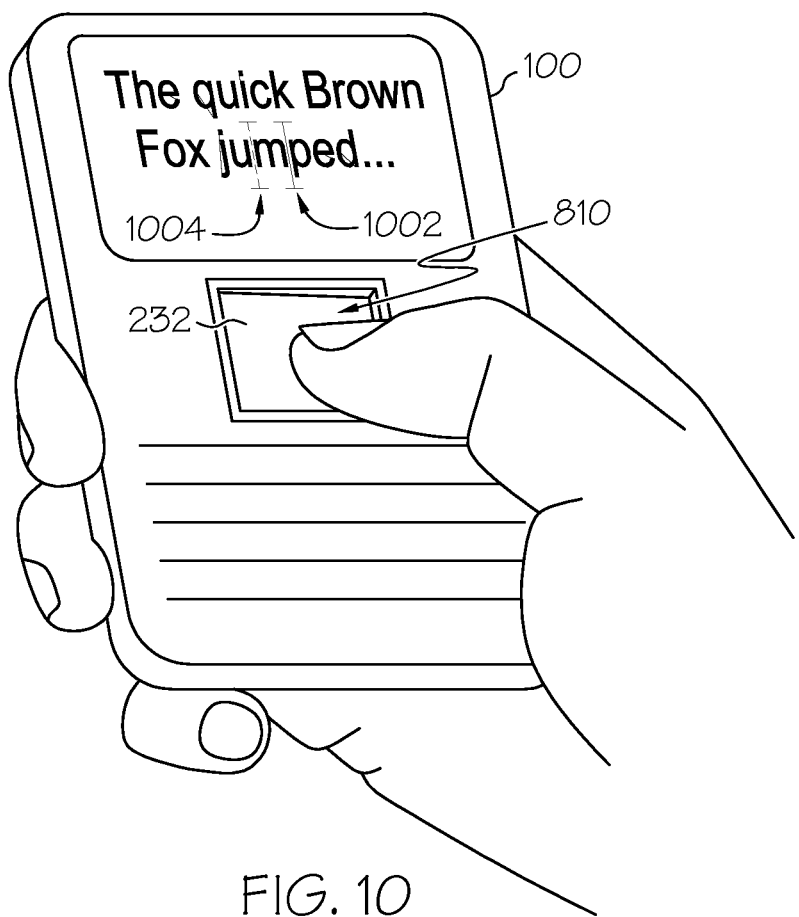
FIG. 10 illustrates the portable electronic device of FIG. 1 where an element on the display has been moved in response to the user has depressing the touch surface of the multi-modal user input device of FIG. 2, in accordance with one example.

For example, FIG. 10 shows a user depressing the fourth outer region 810 of the touch surface 232. As can be seen in FIG. 10 this action results in the cursor moving from a first position 1004, which is to left of the letter "m" in the word "jumped", to a second position 1002, which is to right of the letter "m".

In one example, the discrete or incremental movements discussed above are performed as a result of the user depressing an outer or corner region of the touch surface 232 and then releasing the touch surface 232 within a given amount of time. If the controller/processor 1102 determines that the user is continuing to depress an outer or corner region of the touch surface 232 for a given period of time that is greater than a given threshold, the controller/processor 1102 performs a continuous movement action in the direction intended by the user. For example, if the user depresses the second outer region 806 of the touch surface 232 longer than a given threshold, the controller processor 1102 continuously moves the cursor/pointer in the up (+y in the X/Y plane) direction until the user releases the touch surface 232.

In addition to detecting a user intended direction, the controller/processor 1102 can also determine a speed/velocity and/or acceleration of user intended movement based on the force/pressure or change in force/pressure detected by the sensors 402, 404, 506, 508. For example, as the user depresses an outer or corner region of the touch surface 232 the sensors 402, 404, 506, 508 generate one or more signals that correlate to the amount of force/pressure being exerted on the sensors. The controller/processor 1102 analyzes these signals to determine an amount of force/pressure being exerted on the sensors. The controller/processor 1102 compares this value to a set of values stored in memory that are associated with a given speed/velocity. The controller/processor 1102 then performs a movement action at the determined speed/velocity. The controller/processor 1102 can also analyze any change in force/pressure to determine how much to increase or decrease the speed of movement. Continuous movement with varying degrees of speed/velocity is advantageous when moving through large amounts of data such as documents, maps, or the like.

Figure 11:
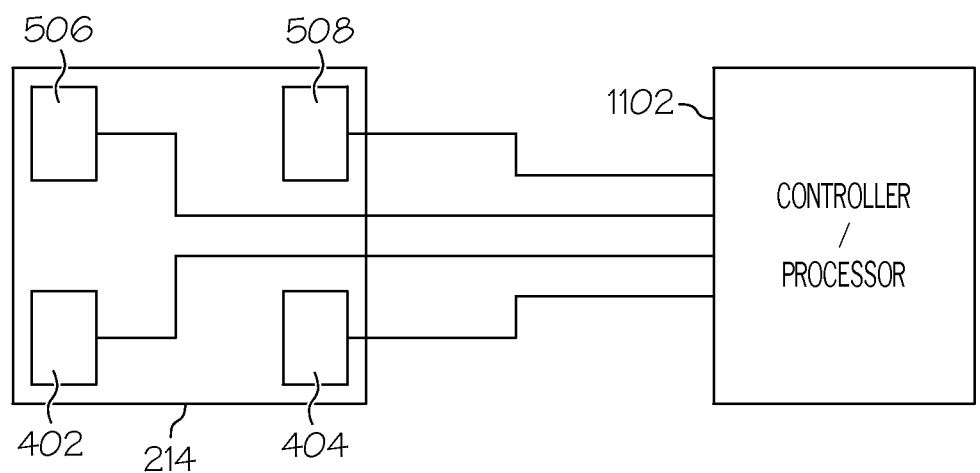
FIG. 11 illustrates electrical connections between sensors of the multi-modal user input device of FIG. 2 and a controller/processor, in accordance with one example.

In one example, the sensors 402, 404, 506, 508 (and any sensing elements disposed within the domed region 422 of the membrane 204) detect force/pressure using inductors. For example, each sensor 402, 404, 506, 508 comprises an inductor and a metal plate disposed above each conductor. A controller/processor 1102 is communicatively coupled to each of these sensors 402, 404, 506, 508, as shown in FIG. 11. Current is passed through each conductor and a magnetic field is generated. As force/pressure is exerted on each sensor as a result of the user depressing the sensor touchpad module 234, as discussed above, the metal plate is transitioned closer to the inductor, thereby increasing the magnetic flux. This change in magnetic flux is represented by a signal generated by each sensor 402, 404, 506, 508. The controller/processor 1102 analyzes this signal and compares it to the signals from the other sensors to determine a user intended direction, as discussed above. These signals can also be compared to thresholds to determine magnitude, as discussed above, as well.

In addition to inductance based sensing, the sensors can also perform capacitance based sensing as well. For example, each of the sensors 402, 404, 506, 508 are disposed on the top surface of the second flex member 214 and a corresponding set of sensors are disposed on the bottom surface of the first flex member 212. Each sensor includes electrical conductors. In one example, each sensor includes a small electrically conductive area that forms one plate of a capacitor. Each of these electrical conductors or sensors is able to have any suitable shape, such as a plate, wire segment, printed conductor segment, and the like.

In one example, a volume between the first flex member 212 and the second flex member 214 is filled with a dielectric material, such as a dielectric gel. An example of a suitable dielectric gel used to fill the volume is a silicone based gel that contains metallic filings. Other dielectric materials, such as liquids, gasses, yieldable solids, and the like, are able to be used to fill this space. The dielectric material within the volume is in contact with first and second flex members 212, 214.

The controller/processor 1102 is communicatively coupled to each of these small electrical sensors and measures the capacitance between each of the conductors or sensors. The controller/processor 1102 of one example measures capacitance by applying an alternating current (AC) signal to each sensor on the second flex member 214 and measures the signal received by one or more corresponding sensors on the first flex member 212. Based on these measurements, the processor determines measured changes in capacitance between sensors over time. A decrease in signal level between the applied AC signal and the signal received by corresponding sensors is proportional to a decrease in capacitance between those two sensors.

The capacitance between sensors on the first flex member 212 and sensors on the second flex member 214 varies as a user presses the sensor touchpad module 234 because the distances between the respective sensors on those two surfaces changes. In particular, distances between sensors on the first flex member 212 and on the second flex member 214 decrease in an area where the user presses on the sensor touchpad module 234. Distances also are able to increase between sensors on the top first flex member 212 and on the second flex member 214 in areas removed from the user's pressing because the dielectric material in the depressed area is displaced and moves to other portions of the volume. By measuring changes in capacitance to determine a user intended direction, as discussed above. These changes in capacitance can also be used to determine magnitude, as discussed above, as well.

It should be noted that the controller/processor 1102 can also monitor application context to determine a default user input mode. For example, if a browser is opened, a discrete drag input using the sensor touchpad module 234 can be used to move the cursor pointer and a press/tilt movement of the sensor touchpad module 234 can be used to invoke a secondary cursor navigation mode for continuous page scrolling. Another example is with respect to editing text or composing an Email. In this example, the controller/processor 1102 can lock the cursor to a discrete input mode when press/tilt input is detected (i.e., advance one incremental step) to prevent the user from accidentally overshooting characters using fine cursor control. In an Email context, a secondary input mode of operation can be implemented for press/tilt when a modifier key is held down such as ALT for continuous page panning and scrolling or Shift for setting and continuously adjusting the text selection area. In addition to the above, visual feedback can be given to the user for indicating when the cursor mode has changed. For example, the cursor can change from a "Square Carrot Cursor" during discrete scroll input to a "Pipe Cursor" or "Pointer Cursor" during continuous cursor input. Also, visual feedback such as a change in illumination or color of illumination can performed on various areas of the sensor touchpad module 234 to visually indicate which user input mode is currently active.

Figure 12:
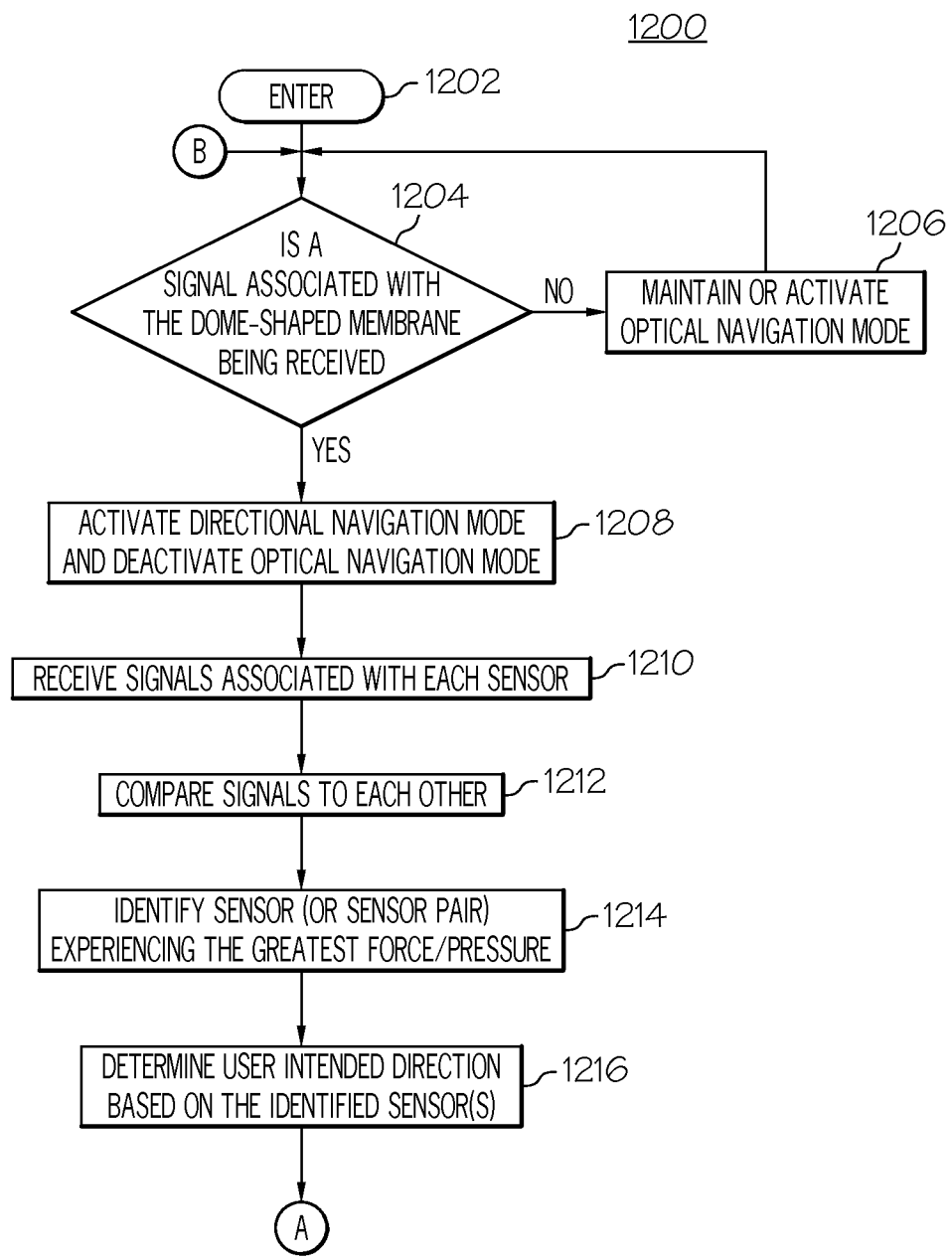
FIGS. 12-13 illustrates a multi-modal input device management process, in accordance with one example.
Figure 13:
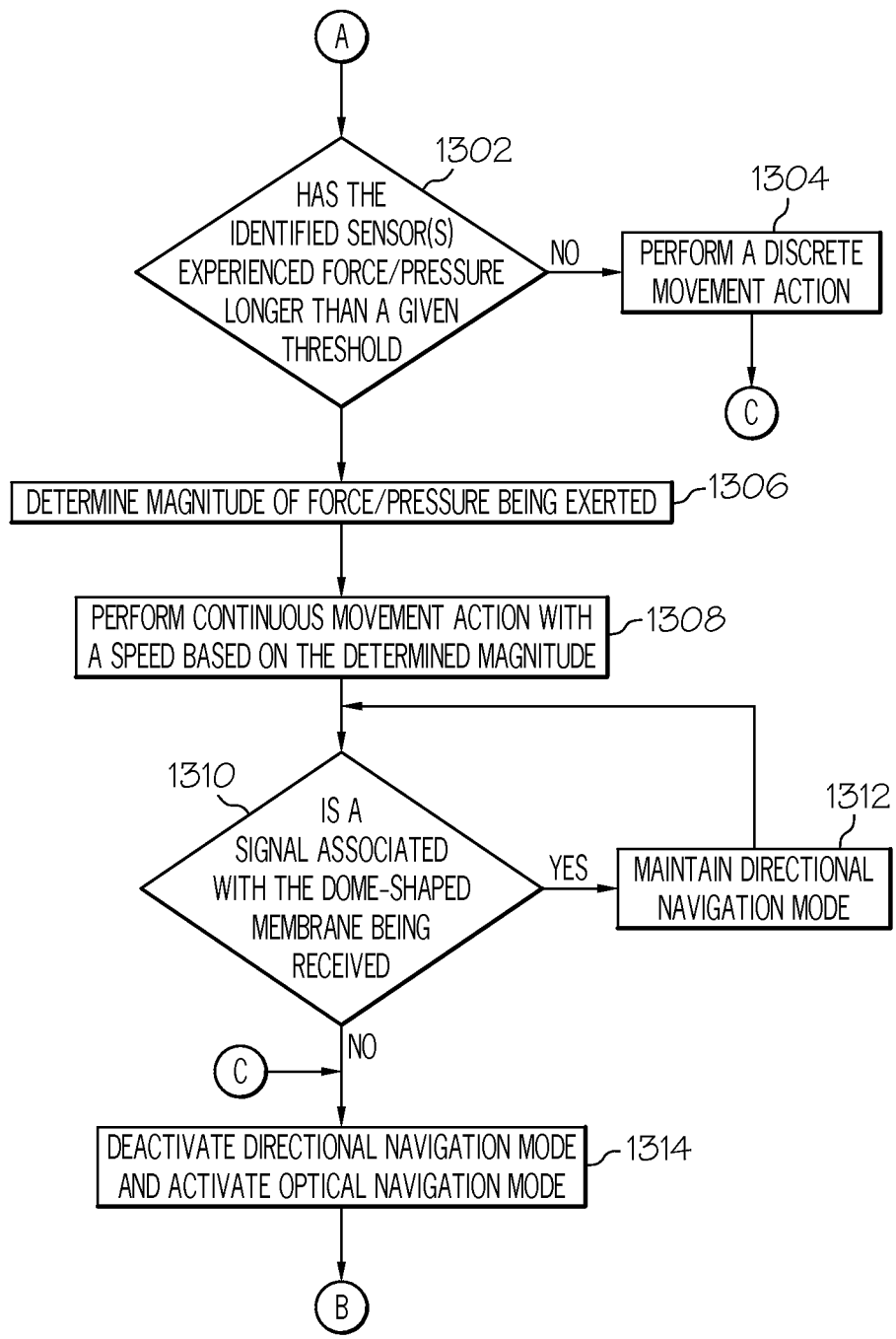

FIGS. 12-13 are flow diagrams for a multi-modal input device management process 1200. The multi-modal input device management process 1200 manages the various modes, such as a finger movement navigation mode and a directional navigation mode, of the input device 102 and performs either finger movement navigation actions, discrete movement actions, or continuous movement actions with variable speed, as discussed above with respect to FIGS. 1-11. This multi-modal input device management process 1200 is performed by the controller/processor 1102 discussed above.

The operational flow diagrams of FIGS. 12-13 begin at step 1202 and continue directly to step 1204. The controller/processor 1102, at step 1204, determines if a signal associated with the dome-shaped membrane 204, is being received. As discussed above, a signal, in one example, is generated when the user depresses the sensor touchpad module 234 and the dome-shaped membrane 204 contacts the top surface 406 of the second flex member 214. Alternatively, the dome-shaped membrane 204 can comprise sensors disposed between the bottom surface of the domed region and the top surface of the second flex member 214, as discussed above. In this example, the controller/processor 1102 determines the detected force/pressure is above a given threshold.

If the result of determination at step 1204 is negative, the controller/processor 1102, at step 1206, maintains (or activates) the finger movement navigation mode (also referred to as "optical navigation mode") discussed above. If the result of this determination is positive, the controller/processor 1102, at step 1208, activates the directional navigation mode and deactivates the finger movement navigation mode (also referred to as "optical navigation mode"). The controller/processor 1102, at step 1210, receives one or more signals from each sensor 402, 404, 506, 508 that represent the amount of force/pressure being experienced by the sensors as a result of the user depressing one of the outer or corner regions 804, 806, 808, 810, 812, 814, 816, 818 of the touch surface 232. The controller/processor 1102, at step 1212, compares at least two of these signals to each other. The controller/processor 1102, at step 1214, identifies a sensor (or sensor/pair) that is experiencing the greatest force/pressure based on the comparison at step 1212. The controller/processor 1102, at step 1216, then determines the user intended direction based on the identified sensor(s), as discussed above with respect to FIGS. 8-10. The control then flows to entry point A of FIG. 13.

The controller/processor 1102, at step 1302, determines if the identified sensor(s) has/have experienced the force/pressure longer than a given threshold. If the result of this determination is negative, the controller/processor 1102 performs a discrete movement action, as discussed above, and the control flows to step 1314. If the result of this determination is positive, the controller/processor 1102, at step 1306, determines the magnitude of force/pressure being exerted. As discussed above, the controller/processor 1102 compares this magnitude to information stored in memory that identifies a speed/velocity associated with the determined magnitude.

The controller/processor 1102, at step 1308, then performs a continuous movement action with a given speed/velocity associated with the determined magnitude. The controller/processor 1102, at step 1310, then determines if the signal associated with the dome-shaped membrane 204 is still being received. If the result of this determination is positive, the controller/processor 1102, at step 1312, maintains the directional navigation mode. The control flow then returns to step 1310. If the result of this determination is negative, the controller/processor 1102, at step 1314, deactivates the directional navigation mode and activates the finger movement navigation mode (also referred to as "optical navigation mode"). The control then flows to entry point B in FIG. 12.

As can be seen from the above discussion, the input device 102 of the various examples given above is advantageous over conventional input devices. For example, the same component of the input device 102 can be used as a finger movement navigation device and as a directional navigation device. The input device 102 automatically switches between these modes based on the amount of force/pressure exerted on the touch surface 232 of the input device 102. In the finger movement navigation mode, the user is able to control the speed of a movement action on a user interface display presentation by varying the speed/velocity of the user's finger (or stylus) across the touch surface 232.

In the directional navigation mode, the input device 102 performs discrete or incremental movements based on the duration of touch surface depression or based on a detected amount of force pressure. The user can select between discrete/incremental or continuous movements by holding the touch surface down for a given amount of time. Also, the user can vary the speed of movement in the directional navigation mode by applying more or less force/pressure to the touch surface. As can be seen, the input device 102 provides the user with more control and precision with respect to interacting with items presented on a display 104 of the portable electronic device 100.

In one example, with respect to finger movement navigation, the input device 102 detects a sliding, dragging, pushing, or pulling movement (e.g., a gestural movement) of a user's finger or stylus (or similar object) across a top portion of the input device 102. The device 100 distinguishes a gestural movement from a pressing action based on the amount of pressure applied during the gesture and/or the specific movement involved during the gesture. Based upon a starting position and ending position of the gestural movement (and optionally any intermediate positions) a user input direction is determined. In one operating mode of the electronic device 100, processing determines a direction to move a user interface element based upon the attributes/characteristics of the detected gestural movement, and optionally determines a magnitude, such as distance to move the element or speed with which to move the element, based upon a velocity, acceleration, and/or deceleration of the user's finger or stylus during the gestural movement.

In another example, the input device 102 can be moved in various directions by the user's finger or stylus. For example, the user is able to push, or pull the input device 102 in multiple directions along the X/Y plane. The user is also able to tilt the input device 102 in various directions along its center axis. The degree of tilt, in one example, can be varied by the user. In either example, the user is also able to press the input device 102 as the input device is being moved/tilted, hold the input device 102 at a tilted or a pushed/pulled position, and vary the degree of pressure. The input device 102 determines the direction (and optionally degree) of movement or tilt as well as a magnitude of pressure exerted by the user onto input device 102. Based upon the direction (and optionally degree) of movement and magnitude of pressure that has been determined, a user input direction and magnitude is determined. In one operating mode of the electronic device 100, processing determines a direction to move a user interface element based upon the detected movement, and determines a magnitude, such as distance to move the element or speed with which to move the element, based upon the pressure (and optionally the degree of movement as well).

Figure 14:
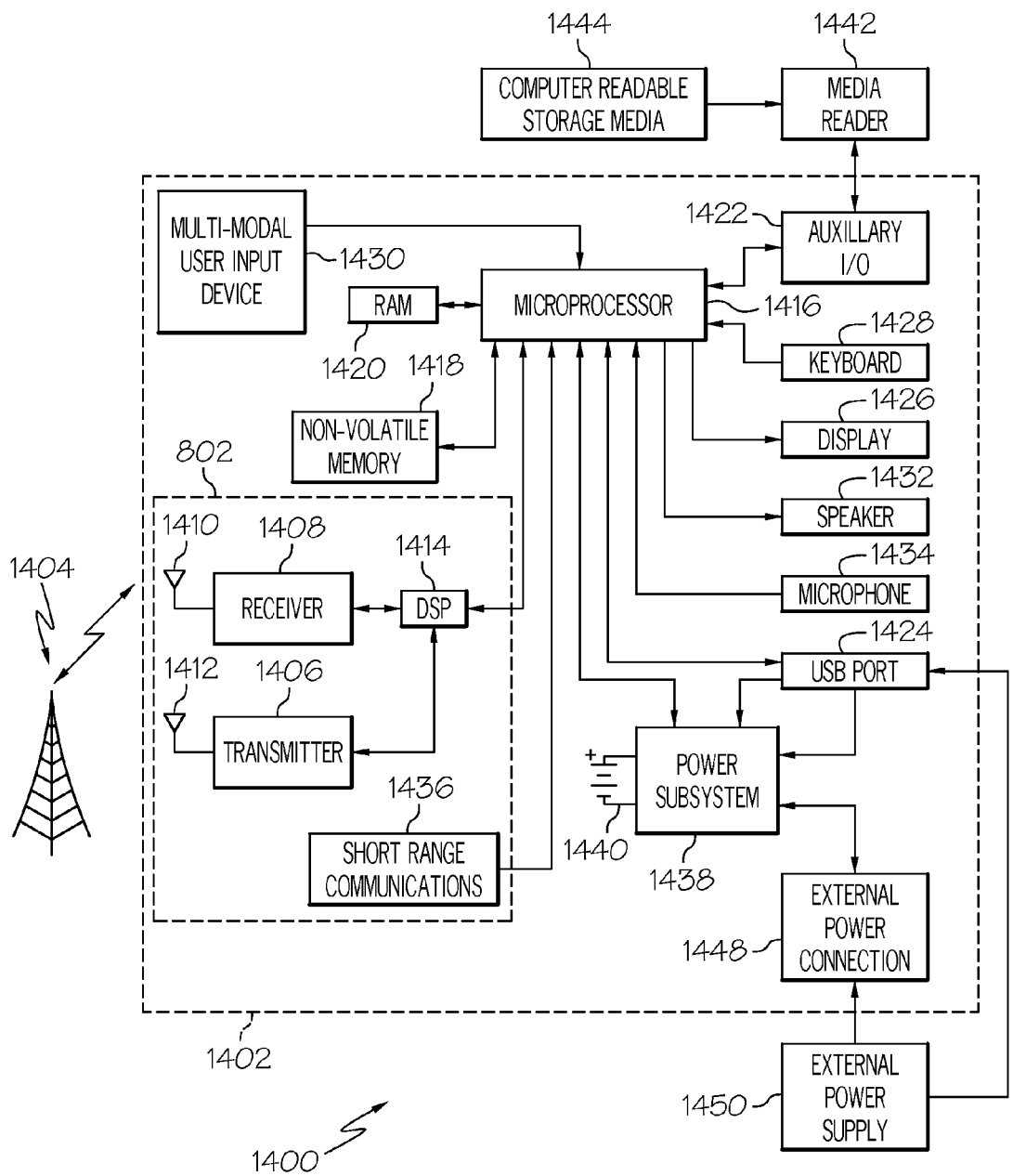
FIG. 14 is a block diagram of an electronic device and associated components in which the systems and methods disclosed herein may be implemented.

FIG. 14 is a block diagram of an electronic device and associated components 1400 in which the systems and methods disclosed herein may be implemented. In this example, an electronic device 1402 is a wireless two-way communication device with voice and data communication capabilities. Such electronic devices communicate with a wireless voice or data network 1404 using a suitable wireless communications protocol. Wireless voice communications are performed using either an analog or digital wireless communication channel. Data communications allow the electronic device 1402 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 1402 is an example electronic device that includes two-way wireless communications functions. Such electronic devices incorporate communication subsystem elements such as a wireless transmitter 1406, a wireless receiver 1408, and associated components such as one or more antenna elements 1410 and 1412. A digital signal processor (DSP) 1414 performs processing to extract data from received wireless signals and to generate signals to be transmitted. The particular design of the communication subsystem is dependent upon the communication network and associated wireless communications protocols with which the device is intended to operate.

The electronic device 1402 includes a microprocessor 1416 (such as the controller/processor 1102 discussed above) that controls the overall operation of the electronic device 1402. The microprocessor 1416 interacts with the above described communications subsystem elements and also interacts with other device subsystems such as non-volatile memory 1418 and random access memory (RAM) 1420. The non-volatile memory 1418 and RAM 1420 in one example contain program memory and data memory, respectively. The microprocessor 1416 also interacts with an auxiliary input/output (I/O) device 1422, a Universal Serial Bus (USB) Port 1424, a display 1426, a keyboard 1428, multi-modal user input device 1430 (such as the multi-modal user input device 102 discussed above), a speaker 1432, a microphone 1434, a short-range communications subsystem 1436, a power subsystem 1438, and any other device subsystems.

A battery 1440 is connected to a power subsystem 1438 to provide power to the circuits of the electronic device 1402. The power subsystem 1438 includes power distribution circuitry for providing power to the electronic device 1402 and also contains battery charging circuitry to manage recharging the battery 1440. The power subsystem 1438 includes a battery monitoring circuit that is operable to provide a status of one or more battery status indicators, such as remaining capacity, temperature, voltage, electrical current consumption, and the like, to various components of the electronic device 1402. An external power supply 1446 is able to be connected to an external power connection 1448.

The USB port 1424 further provides data communication between the electronic device 1402 and one or more external devices. Data communication through USB port 1424 enables a user to set preferences through the external device or through a software application and extends the capabilities of the device by enabling information or software exchange through direct connections between the electronic device 1402 and external data sources rather then via a wireless data communication network.

Operating system software used by the microprocessor 1416 is stored in non-volatile memory 1418. Further examples are able to use a battery backed-up RAM or other non-volatile storage data elements to store operating systems, other executable programs, or both. The operating system software, device application software, or parts thereof, are able to be temporarily loaded into volatile data storage such as RAM 1420. Data received via wireless communication signals or through wired communications are also able to be stored to RAM 1420. As an example, a computer executable program configured to perform the multi-modal input device management process 1200, described above, is included in a software module stored in non-volatile memory 1418.

The microprocessor 1416, in addition to its operating system functions, is able to execute software applications on the electronic device 1402. A predetermined set of applications that control basic device operations, including at least data and voice communication applications, is able to be installed on the electronic device 1402 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 1402 through, for example, the wireless network 1404, an auxiliary I/O device 1422, USB port 1424, short-range communications subsystem 1436, or any combination of these interfaces. Such applications are then able to be installed by a user in the RAM 1420 or a non-volatile store for execution by the microprocessor 1416.

In a data communication mode, a received signal such as a text message or web page download is processed by the communication subsystem, including wireless receiver 1408 and wireless transmitter 1406, and communicated data is provided the microprocessor 1416, which is able to further process the received data for output to the display 1426, or alternatively, to an auxiliary I/O device 1422 or the USB port 1424. A user of the electronic device 1402 may also compose data items, such as e-mail messages, using the keyboard 1428, which is able to include a complete alphanumeric keyboard or a telephone-type keypad, in conjunction with the display 1426 and possibly an auxiliary I/O device 1422. Such composed items are then able to be transmitted over a communication network through the communication subsystem.

For voice communications, overall operation of the electronic device 1402 is substantially similar, except that received signals are generally provided to a speaker 1432 and signals for transmission are generally produced by a microphone 1434. Alternative voice or audio I/O subsystems, such as a voice message recording subsystem, may also be implemented on the electronic device 1402. Although voice or audio signal output is generally accomplished primarily through the speaker 1432, the display 1426 may also be used to provide an indication of the identity of a calling party, the duration of a voice call, or other voice call related information, for example.

Depending on conditions or statuses of the electronic device 1402, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1436 is a further optional component which may provide for communication between the electronic device 1402 and different systems or devices, which need not necessarily be similar devices. For example, the short-range communications subsystem 1436 may include an infrared device and associated circuits and components or a Radio Frequency based communication module such as one supporting Bluetooth® communications, to provide for communication with similarly-enabled systems and devices.

A media reader 1442 is able to be connected to an auxiliary I/O device 1422 to allow, for example, loading computer readable program code of a computer program product into the electronic device 1402 for storage into non-volatile memory 1418. In one example, computer readable program code includes instructions for performing the pressure detecting user input device operating process 1200, described above. One example of a media reader 1442 is an optical drive such as a CD/DVD drive, which may be used to store data to and read data from a computer readable medium or storage product such as computer readable storage media 1444. Examples of suitable computer readable storage media include optical storage media such as a CD or DVD, magnetic media, or any other suitable data storage device. Media reader 1442 is alternatively able to be connected to the electronic device through the USB port 1424 or computer readable program code is alternatively able to be provided to the electronic device 1402 through the wireless network 1404.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A user input device for an electronic device, comprising:
   a base member;

a flex member disposed above the base member;
a sensor touchpad module disposed above the flex member, the flex member being electrically coupled to the base member via a flexible connector comprising electrical pathways, and where the flex member, while coupled to the sensor touchpad module and via the flexible connector coupled to the base member, being configured to pivot about a center axis of the sensor touchpad;
a dome-shaped member is disposed between the base member and the flex member, a peak point of the dome-shaped member being located substantially at the center axis of the sensor touchpad module, and wherein the sensor touchpad module comprising a sensor touchpad having a touchable surface, the sensor touchpad module being configured to detect gesture motion upon the touchable surface;
a plurality of pressure sensors disposed between the base member and the flex member; and
a processor, communicatively coupled to the plurality of pressure sensors, the processor configured to manage a set of user input modes based on whether at least one of a first set of signals associated with a first user input mode and a second set of signals associated with a second user input mode has been detected, where the first set of signals are generated based on a vertical movement of the sensor touchpad module and the flex member vertically displacing a contact element associated with the dome-shaped member, and where the second set of signals are generated with a tilting movement of the sensor touchpad module and the flex member about the peak point of the dome-shaped member causing actuation of at least one of the plurality of pressure sensors; and the processor being further configured to:
detect the first set of signals;
prior to detecting the first set of signals:
 activate a first input mode that detects a gesture traversing at least one direction upon the touchable surface,
 modify a user interface display presentation in response to the gesture being detected; and
in response to detecting the first set of signals,
 deactivate the first input mode;
 activate a second input mode that detects at least a direction of tilt of the sensor touchpad module; and
 modify the user interface display presentation in response to the direction of tilt being detected.

2. The user input device of claim 1, where the dome-shaped member is resilient such that it exerts an axial force against the bottom surface of the flex member in a vertical direction away from the base member creating a tilting or pivoting point about the peak point of the dome-shaped member along the center axis of the sensor touchpad module, the axial force returning the sensor touchpad module to a resting position when not being depressed from above.

3. The user input device of claim 2, the first set of signals representing at least one of:
the sensor touchpad module being depressed a given distance; and
a given amount of force experienced by a contact element corresponding to the dome-shaped member as the sensor touchpad module is being depressed.

4. The user input device of claim 1, wherein the base member comprises a set of conductive members disposed on the base member, at least one conductive member in the set of conductive members coupled to at least one sensor in the plurality of sensors.

5. The user input device of claim 1, the second set of signals representing at least a given amount of force being applied to at least one sensor in the plurality of sensors.

6. The user input device of claim 1, the processor modifying the user interface display by performing a movement action in a direction corresponding to a direction of a gesture that has been detected.

7. The user input device of claim 1, the processor modifying the user interface display by performing a discrete movement action in a direction corresponding to the direction of tilt being detected.

8. The user input device of claim 1, the processor further configured to detect the direction of tilt by:
determining that the second input mode has been activated;
comparing, in response to the second input mode being activated each signal in the second set of signals to each other;
identifying, based on the comparing, at least one sensor in the plurality of sensors experiencing a greatest amount of force; and
determining that the sensor touchpad module is being tilted in a given direction that corresponds to the at least one sensor that has been identified.

9. The user input device of claim 8, the processor further configured to:
monitor an amount of time the sensor touchpad module is being tilted in the given direction;
perform a discrete movement action in the given direction on the user interface display presentation in response to determining that the amount of time being below a given threshold; and
perform a continuous movement action in the given direction on the user interface display presentation in response to determining that the amount of time being above the given threshold.

10. The user input device of claim 9, the processor further configured to:
perform the continuous movement with a given speed based on a given amount of force being experienced by the identified at least one sensor as represented by a signal in the second set of signals.

11. A portable electronic device, comprising:
a processor;
a memory, communicatively coupled to the processor, configured to store information operated upon by the processor; and
a user input device, comprising:
 a base member;
 a flex member disposed above the base member;
 a sensor touchpad module disposed above the flex member, the flex member being electrically coupled to the base member via a flexible connector comprising electrical pathways, and where the flex member, while coupled to the sensor touchpad module and via the flexible connector coupled to the base member, being configured to pivot about a center axis of the sensor touchpad module;
 a dome-shaped member is disposed between the base member and the flex member, a peak point of the dome-shaped member being located substantially at the center axis of the sensor touchpad, and wherein the sensor touchpad module comprising a sensor touchpad having a touchable surface, the sensor touchpad module being configured to detect gesture motion upon the touchable surface;
 a plurality of pressure sensors disposed between the base member and the flex member;

a vertical dome-shaped member disposed between the top surface of the base member and the bottom surface of the flex member, a peak point of a dome of the vertical dome-shaped member being located substantially on a center axis of the sensor touchpad; and a processor, communicatively coupled to the plurality of sensors, the processor configured to manage a set of user input modes based on whether at least one of a first set of signals associated with a first user input mode and a second set of signals associated with a second user input mode has been detected, where the first set of signals are generated based on a vertical movement of the sensor touchpad module and the flex member vertically displacing a contact element associated with the dome-shaped member, and where the second set of signals are generated with a tilting movement of the sensor touchpad module and the flex member about the peak point of the dome-shaped member causing actuation of at least one of the plurality of pressure sensors; and the processor being further configured to:

detect the first set of signals;

prior to detecting the first set of signals:
    activate a first input mode that detects a gesture traversing at least one direction upon the touchable surface,
    modify a user interface display presentation in response to the gesture being detected; and in response to detecting the first set of signals,
    deactivate the first input mode;
    activate a second input mode that detects at least a direction of tilt of the sensor touchpad module; and
    modify the user interface display presentation in response to the direction of tilt being detected.

\* \* \* \* \*